(12) United States Patent
Phillips

(10) Patent No.: US 7,766,358 B1
(45) Date of Patent: Aug. 3, 2010

(54) DEVICE FOR CONNECTING BICYCLES IN TANDEM

(75) Inventor: Kirt Anthony Phillips, Washougal, WA (US)

(73) Assignee: Kirt Phillips, Washougal, WA (US)

( * ) Notice: Subject to any disclaimer, the term of this patent is extended or adjusted under 35 U.S.C. 154(b) by 122 days.

(21) Appl. No.: 11/888,028

(22) Filed: Jul. 30, 2007

(51) Int. Cl.
*B62K 27/12* (2006.01)

(52) U.S. Cl. .................. 280/204; 280/209; 280/292

(58) Field of Classification Search ............... 280/204, 280/209, 292
See application file for complete search history.

(56) References Cited

U.S. PATENT DOCUMENTS

| | | | | |
|---|---|---|---|---|
| 3,877,723 A | * | 4/1975 | Fahey et al. ............... | 280/204 |
| 4,261,592 A | * | 4/1981 | Busseuil ................. | 280/292 |
| 5,743,543 A | * | 4/1998 | Chiu ..................... | 280/231 |
| 5,749,592 A | * | 5/1998 | Marchetto ............... | 280/292 |
| 5,842,710 A | * | 12/1998 | Couture ................. | 280/204 |
| 6,286,847 B1 | * | 9/2001 | Perrin ................... | 280/204 |
| 6,561,533 B2 | * | 5/2003 | Snobl .................... | 280/204 |
| 6,983,947 B2 | * | 1/2006 | Asbury et al. ............ | 280/204 |
| 7,234,719 B2 | * | 6/2007 | Giese .................... | 280/292 |

* cited by examiner

*Primary Examiner*—Lesley Morris
*Assistant Examiner*—Marlon A Arce (57) ABSTRACT

There is disclosed a device for connecting a lead bicycle and a trailing bicycle into a tandem configuration consisting of first and second connectors attachable to, for example, the seat post of the lead bicycle and to the head post or frame of the trailing bicycle, respectively; a telescoping linking bar releaseably attachable to the two connectors, the linking bar having a section that allows a limited amount of flexing longitudinal travel; wherein the linking bar connections permit horizontal, vertical and torsional rotation and which release and de-couple the bicycles when rotation exceeds predetermined limits, which may occur when one bicycle falls or the trailing bicycle begins to pass the lead bicycle.

12 Claims, 13 Drawing Sheets

DEVICE FOR CONNECTING BICYCLES IN TANDEM

CROSS-REFERENCE TO RELATED APPLICATIONS

The priority of U.S. Application No. 60/648,446 filed Feb. 1, 2005 is claimed.

BACKGROUND OF THE INVENTION

Two bicyclists of unequal ability often have difficulty staying together while riding. To remedy this situation, many cyclists couple their bicycles together in a tandem arrangement in order to combine efforts and stay together for all or a part of the ride. In the latter case, the bicycles may be decoupled later in the ride, enabling independent riding on the same trip. This situation is common not only for adults riding with children but also for adults riding with other adults of differing cycling ability. Currently, no convenient, lightweight, and safe device exists that provides coupling and decoupling capability when both riders weigh in excess of approximately 90 pounds.

A number of designs exist that permit a bicycle to pull a single-wheel type of trailer with handlebars for a small child to ride. See, for example, U.S. Pat. Nos. 5,067,738 and 5,470,088. While such designs may allow the child to peddle and contribute to the ride, they do not provide capability for the child to ride independently if desired. In addition, such designs have a weight limit that is typically below 90 pounds due to the imbalance that can occur with larger riders on the trailing device since the leading cyclist must provide balance for both riders.

U.S. Pat. No. 6,155,582 discloses a device for towing a child's bicycle in which the front wheel of the child's bicycle is lifted off the ground. This coupling device includes features for relatively quick removal and stowage of the device on the lead bicycle. However, this device also limits the weight of the child rider for the same reasons as the single-wheel trailer type design noted above. In addition, because the tow bar must bear a part of the load necessary to lift the front wheel of the trailing bicycle throughout the ride, the tow bar is necessarily relatively heavy and inconvenient to stow on the lead bicycle when not in use.

A number of devices for coupling two bicycles into a tandem configuration using a linking bar and flexible connection arrangement are known. See U.S. Pat. Nos. 4,261,592, 5,749,592, 6,036,215 and 6,286,847. However, these designs also have a significant drawback in that the linking bar is substantially nonextendable in its longitudinal axis. When two separate bicycles are ridden in alignment one behind the other at equal speeds, the position of one bicycle relative to the other continually changes along the longitudinal axis between the bicycles as each bicycle encounters slightly different road conditions. These changes in relative position along the longitudinal axis can be minor if road conditions are excellent, or very substantial under poor road conditions, e.g., when one bicycle rolls over a bump or a rut. Because a fixed linking bar does not allow flexibility and load-dampening along its longitudinal axis, each bicycle will transmit its own de-stabilizing axial forces directly to the other, creating a less stable and less comfortable ride and resulting in a potential crash when road conditions are poor. In addition, when the lead bicycle is turning sharply, it can be difficult for the trailing bicycle to follow directly behind the lead bicycle, particularly at higher speeds. When this occurs, the directions of travel of each bicycle can quickly diverge, creating a very unstable situation which usually results in both bicycles falling. Thus, this design does not provide for a means to decouple the bicycles or otherwise prevent such an unsafe situation.

U.S. Pat. No. 6,036,215 discloses a means of separating a tandem linking bar based on axial tensile forces exceeding a certain limit. However, this type design can result in an unintended separation when the lead bicycle rider is strenuously towing a heavily loaded trailing bicycle or is towing up a steep incline. Conversely, if the release force needed to separate is high enough to permit the linking bar to remain intact while towing a substantial load, this could have the unintended effect of not detaching should a smaller trailing bicycle and rider fall.

There is therefore a need in the art for a tandem bicycle coupling device with a combination of minimal weight, small profile, and quick. and easy engagement and disengagement that allows safe decoupling and allows for an unequal distribution of forces between the coupled bicycles. These needs and others which will become apparent to one skilled in the art are provided by the present invention, which is summarized and described in detail below,

BRIEF SUMMARY OF THE INVENTION

The present invention provides a device for connecting a lead bicycle and a trailing bicycle into a tandem configuration comprising a first connector attachable to the lead bicycle, a second connector attachable to the trailing bicycle; an optional cargo rack and stowage assembly attachable to the first connector; and a telescoping interconnecting linking bar with releasable connection components on both ends of the linking bar and which includes a segment that allows a fixed amount of free longitudinal travel. One end of the linking bar assembly may be releasably connected to the trailing end of the cargo rack and stowage assembly and the other is releasably connected to the second connector. The linking bar assembly connections permit substantial rotation within the horizontal plane and more limited vertical and torsional rotation, and will release and decouple the bicycles when rotation exceeds predetermined limits, e.g., when one bicycle falls or the trailing bicycle begins to pass the lead bicycle. The telescoping linking bar assembly can be quickly retracted and completely housed inside the cargo rack and stowage assembly for stowage. The cargo rack and stowage assembly and the linking bar assembly housed therein can also be quickly removed from the first connector, which can then be used to accept a variety of accessories. The bicycle connecting device of the invention allows a lead bicycle and a trailing bicycle to be coupled together in a tandem arrangement where each bicycle has a rider and where the trailing bicycle rider may either push or be pulled.

BRIEF DESCRIPTION OF THE DRAWINGS

FIG. 10b is an end elevation view of the connection arrangement shown in FIG. 10a.

DETAILED DESCRIPTION OF PREFERRED EMBODIMENTS

Referring to the drawings, wherein the same reference numbers refer to the same elements of the invention, there is illustrated a bicycle connecting assembly 100 for coupling a lead bicycle and a trailing bicycle in a tandem arrangement. Connecting assembly 100 includes a first connector 101, a second connector 102, and a telescoping linking bar assembly 103 comprising a cargo rack and stowage assembly 103A and a telescoping coupling assembly 103B.

Figure 1:
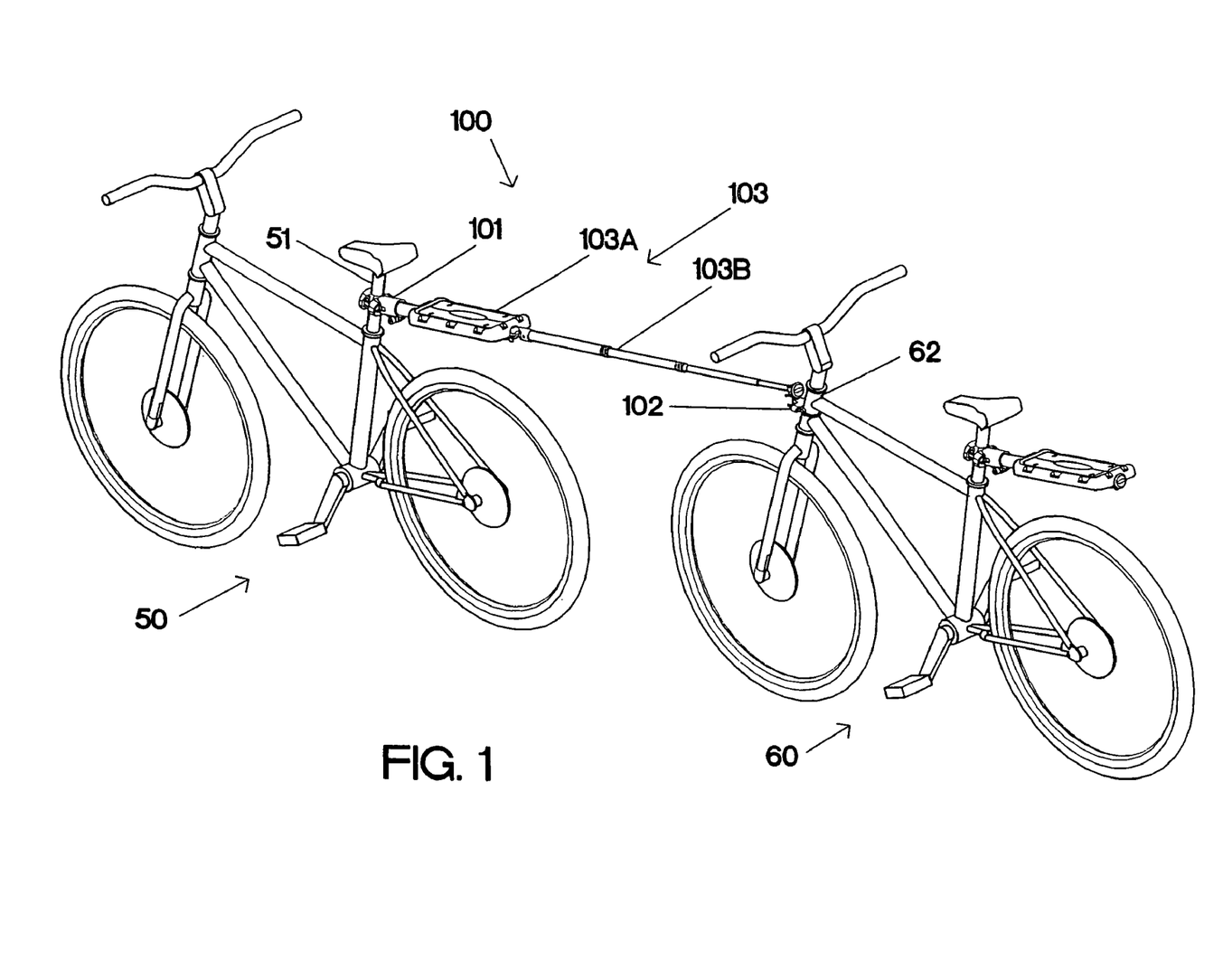
FIG. 1 is a perspective view of an exemplary embodiment of the invention shown connecting lead and trailing bicycles. In this view, the invention is also shown mounted on the trailing bicycle seat post in a retracted and stowed configuration.
Figure 2:
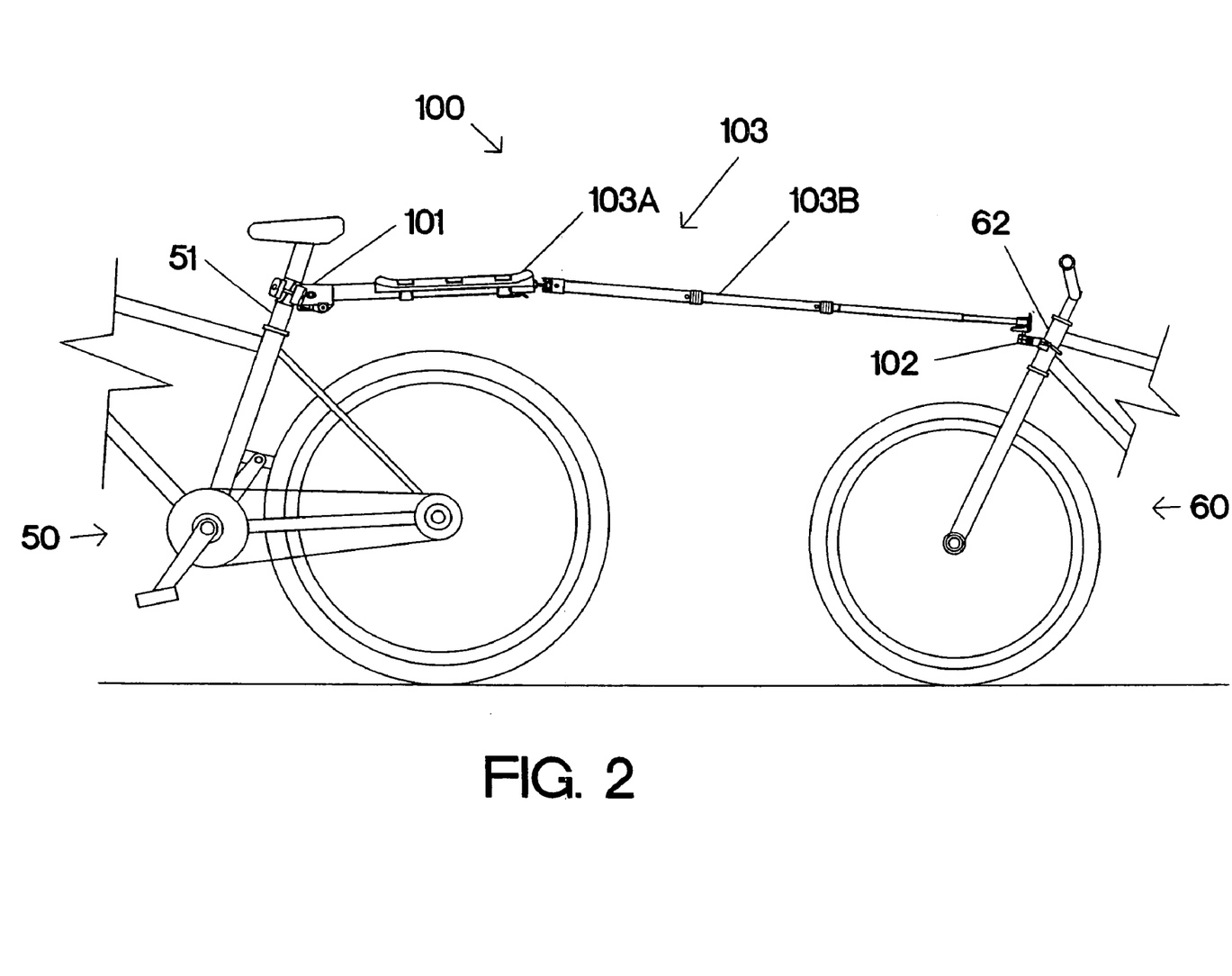
FIG. 2 is an elevation view of the embodiment shown in FIG. 1.

FIGS. 1 and 2 show an exemplary preferred embodiment of connecting assembly 100 joining a lead bicycle 50 to a trailing bicycle 60. Coupling is accomplished by the first connector 101 attaching to the lead bicycle seat post 51 on the leading end of the connecting device and by attaching trailing-bicycle telescoping linking bar 103 to the trailing bicycle head tube 62.

First Connector

Figure 3:
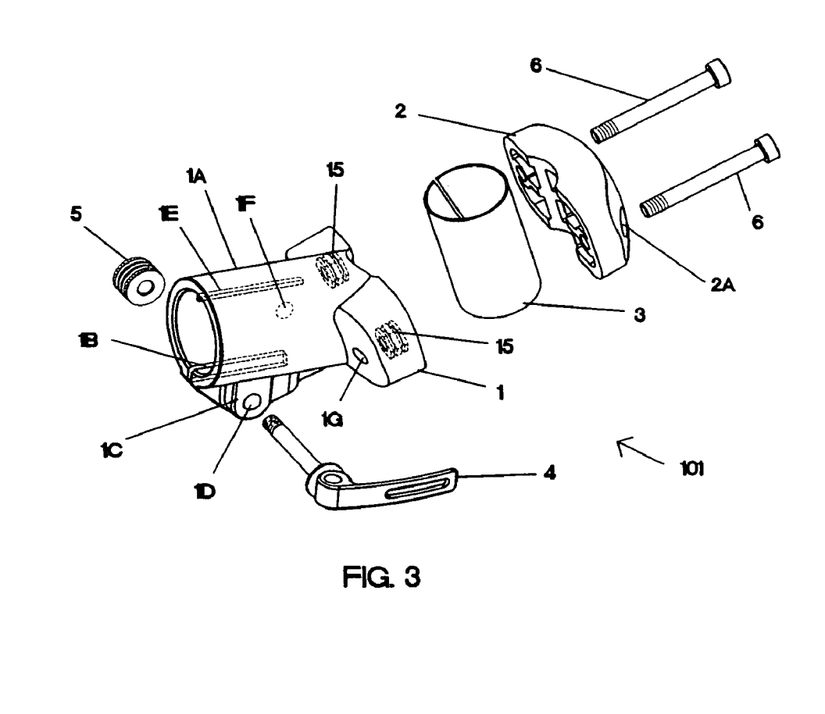
FIG. 3 is a perspective assembly view of an exemplary first connector used in the invention.

As shown in FIG. 3, a preferred embodiment of first connector 101 includes a clamp body 1 and a clamp face 2 which are designed and sized to encircle and clamp onto lead bicycle seat post 51. Clamp body 1 and clamp face 2 are preferably made of a polymer such as polyamide but could also be made from other lightweight and high strength materials such as fiberglass or aluminum. Clamp body 1 and clamp face 2 have respective aligned holes 1G and 2A to accommodate bolts 6 and the clamp body also has nut inserts 15 fixed within clamp body 1 with the nut insert holes in alignment with the bolt holes for attachment by bolts 6.

First connector 101 optionally includes a split bushing 3 which in use is positioned between lead bicycle seat post 51 and clamp body 1 and clamp face 2 in order to increase the frictional grip between the connecting parts so as to resist rotational movement about the seat post. Once in position, bolts 6 are tightened in order to provide a firm connection of first connector 101 to lead bicycle seat post 51. Split bushing 3 is preferably made from a vinyl polymer but rubber or some similar flexible material with a high coefficient of friction could also be used. Other types of clamp connections to the bicycle seat post 51 or to the bicycle frame 50 could also be used to secure the first connector to the bicycle.

The trailing end of clamp body 1 has a split coupling sleeve 1A to accommodate the insertion of the largest diameter tube 8 which optionally may be a component of cargo rack and stowage assembly 103A. A longitudinal ridge 1E runs the length of sleeve 1A along the top inside wall as shown in FIG. 3, which accommodates a corresponding slot 8A in tube 8 when it is inserted into clamp body 1 in order to prevent rotation between these parts and to maintain their alignment under load.

Sleeve 1A is provided with a partial slot 1B along the bottom of the horizontal shaft mount to ease insertion of tube 8 so as to accommodate slight differences in diameter that may occur in production of the parts and in consideration of the differing expansion rates at various temperatures if the parts are made of different materials. Clamp body 1 also has projecting lugs 1C approximately midway along the length and on either side of slot 1B. Lugs 1C have holes 1D through their centers and in alignment with each other to accept a standard quick connect cam and bolt assembly 4 such as those commonly used in the bicycle industry to secure a bicycle seat post to a bicycle frame. In use, cam and bolt assembly 4 is inserted through lug holes 1D, secured with nut 5 and the lever is engaged to clamp the sides of the clamp body sleeve 1A together to eliminate excessive gaps after tube 8 is inserted into clamp body 1.

Second Connector

Figure 4:
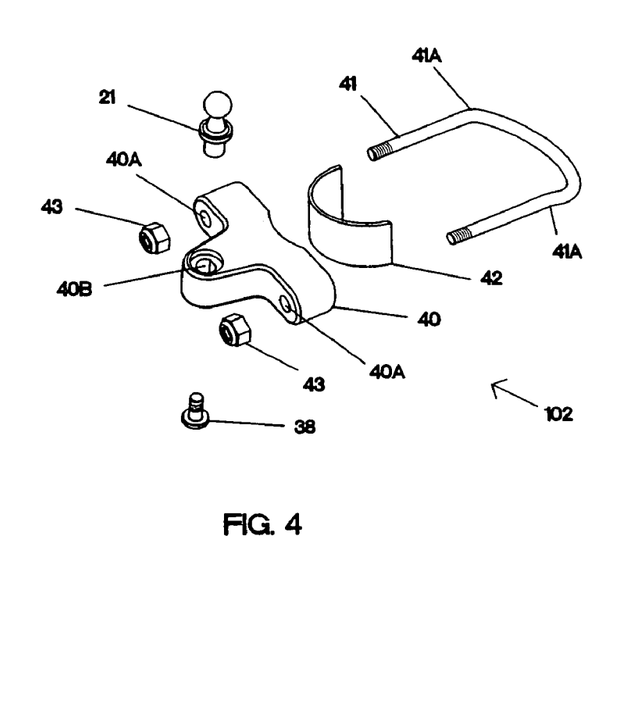
FIG. 4 is a perspective assembly view of an exemplary second connector used in the invention.

FIG. 4 illustrates an exemplary preferred embodiment of second connector 102, which includes ball stud base 40 upon which is bolted a ball stud 21 by bolt 38 through ball stud hole 40B. Second connector 102 attaches to the trailing bicycle head tube 62 by a bent U-bolt 41 and ball stud base 40, which are then secured together via bolt holes 40A with nuts 43. A half bushing 42 is positioned between ball stud base 40 and trailing bicycle head tube 62 in order to provide a connection with increased frictional grip between the connecting parts in order to resist rotational movement about head tube 62. Once in position, nuts 43 may be tightened to provide a firm connection of second connector 102 to trailing head tube 62. Half bushing 42 is preferably made from the same types of material as bushing 3.

U-bolt 41 is preferably slightly bent at 41A as shown in FIG. 4. It should be noted that such a bent shape allows ball stud base 40 to mount to a variety of head tube frame designs where little room is available between the attachment joint of a connecting frame member and the end of the head tube. Other types of clamps may be utilized in lieu of a U-bolt style clamp, including a wire rope design with threaded attachments on the ends. U-bolt 41 is preferably made from steel or aluminum but could also be made from reinforced polymer or materials with substantial tensile strength. Ball stud base 40 is preferably made of a polymer but could also be made from other lightweight materials such as fiberglass or aluminum.

Cargo Rack & Stowage Assembly

Figure 5:
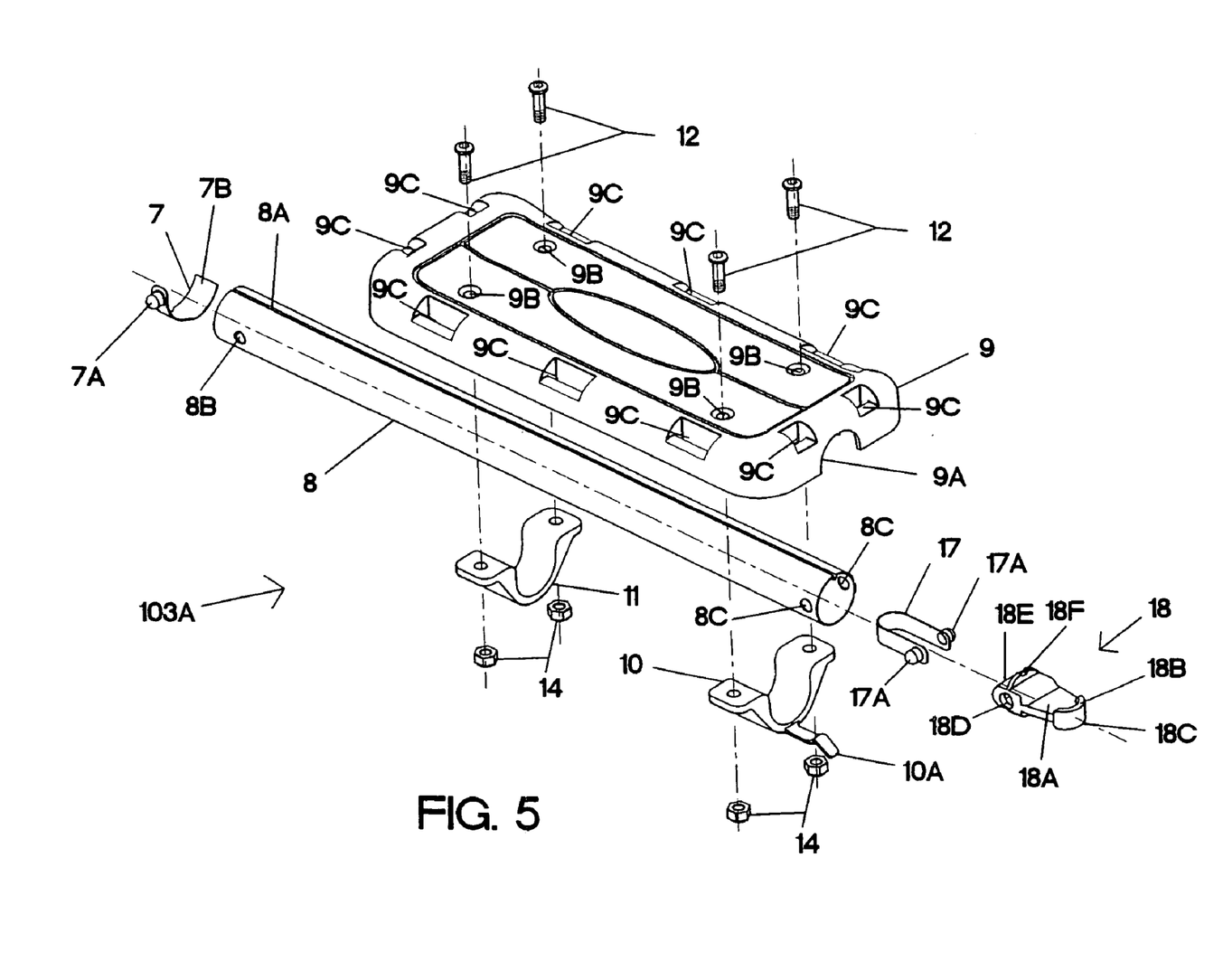
FIG. 5 is a perspective assembly view of an optional exemplary cargo rack and stowage assembly in accordance with one embodiment of the invention.

FIG. 5 illustrates an exemplary preferred embodiment of an optional cargo rack and stowage assembly 103A. The assembly includes a tube 8 with a generally round cross-sectional profile but with a slot 8A that runs the length of the tube. Further, tube 8 has at least one hole 8B at the leading end that aligns with at least one hole 1F in clamp body 1 when tube 8 is fully inserted into clamp body 1 in use. At least one arcuate snap button fastener 7 similar to those made by Valco/Valley Tool & Die, Inc. of North Royalton, Ohio is preferably inserted into the leading end of tube 8 so that the snap button head 7A projects out of hole 8B in tube 8 and the spring flange 7B of snap button fastener 7 align with the interior walls of tube 8.

Cargo rack and stowage assembly 103A also includes ridge connector 18 which has a hollow component 18E with two holes 18D to accommodate a U-shaped dual snap button 17 and a projecting platform 18A with a semi-circular shaped ridge 18B, 18C on either side of the platform. With dual snap button 17 in place inside ridge connector 18 and with dual snap button heads 17A projecting through the ridge connector holes 18D, snap button heads 17A can also engage the corresponding two holes 8C at the trailing end of main tube 8C and lock into place, connecting these components for operation.

Figure 13:
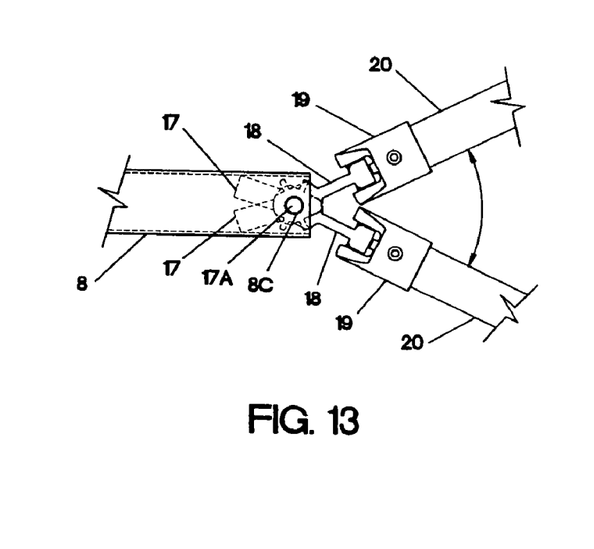
FIG. 13 is a side elevation view of the components of the cargo rack and stowage and the linking bar assemblies demonstrating the range of motion in the vertical plane for this connection.

Ridge connector 18 also has arcuate slotted projections 18F extending upwards and downwards from the center line axis of the snap button holes. These projections act as an alignment guide when ridge connector 18 slides inside tube 8 during telescoping of coupling assembly 103B, preventing rotation between U-shaped dual snap button 17 and ridge connector 18 and assisting in keeping the snap button heads 17A in alignment with corresponding holes 8C at the trailing end of tube 8. Once fully extended with snap button heads 17A projecting through holes 8C in tube 8, the geometry of the parts allows ridge connector 18 limited movement of approximately 60° in the vertical plane, as shown in FIG. 13, which allows connecting device 100 to couple bicycles of different heights. Ridge connector 18 is preferably made of a reinforced polymer such as polyamide but may also be made from other lightweight durable materials such as aluminum, fiberglass or PVC.

Cargo rack and stowage assembly 103A preferably include a cargo platform 9 which mounts to tube 8 via one or more brackets 11 and end cap securing bracket 10 with bolts 12 and nuts 14. Cargo platform 9 may be provided with slots 9C along its edges (see FIG. 5) to accept additional snap-on accessories or permit items to be tied down to the platform.

In use, with first connector 101 mounted on lead bicycle seat post 51, assembly 103A may be connected to first connector 101 by depressing the snap button head 7A and inserting tube 8 into clamp body 1. When tube 8 is fully inserted into the sleeve of clamp body 1, snap button head 7A projects out of the corresponding hole 1F of clamp body 1 and tube 8. Cam and bolt assembly 4 of first connector 101 may then be tightened to reduce gaps between the parts. The use of a snap button and cam and bolt assembly permits cargo rack and stowage assembly 103A to be quickly and easily removed within seconds without tools, and at the same time allows for the attachment and detachment of a variety of other accessories to first connector 101, such as a bottle carrier, a tool kit, a lock holder, a child seat, a pet carrier, a cargo bag, a children's bicycle training bar, etc.

Figure 6A:
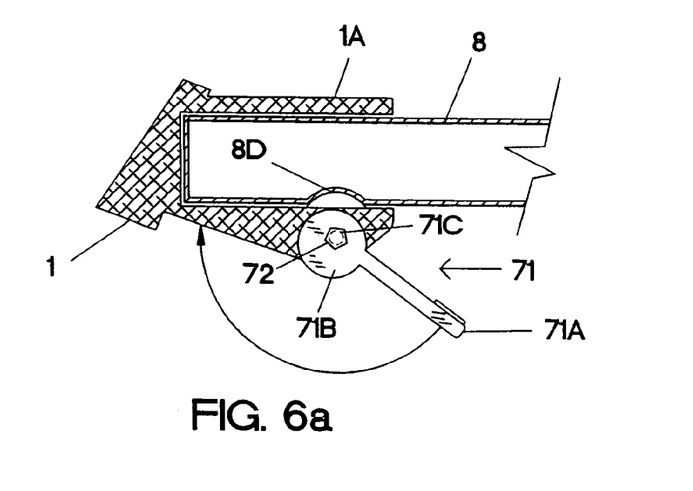
FIG. 6a is a cross-sectional view of an exemplary cam connecting device in an unlocked position for connecting an accessory to the first connector.
Figure 6B:
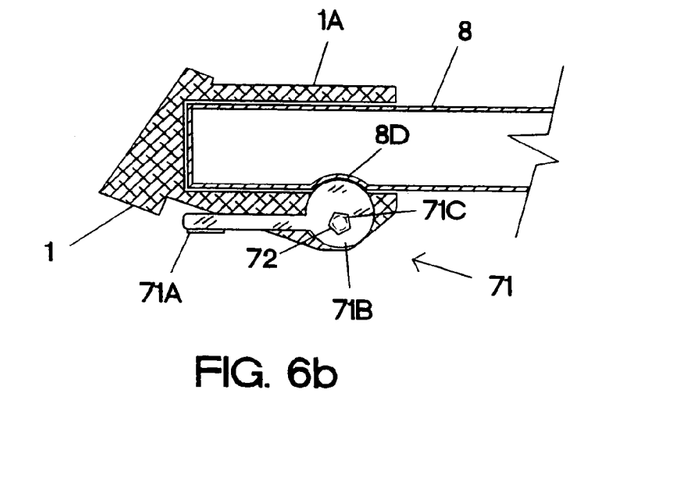
FIG. 6b is a cross-sectional view of the cam connecting device of FIG. 6a in a locked position.

Other quick-fastening arrangements may also be used to secure tube 8 to clamp body 1, including, but not limited, to a V-shaped snap button in place of circular snap button 7 or a spring button fastener mounted externally on or integral with clamp body 1. One such alternative cam connection device 71 is shown in FIGS. 6a and 6b. Cam 71 consists of a lever 71A which is connected to a circular shaped plate 71B with an off-center hole 71C. Cam 71 resides in slot 1B of clamp body 1 and is pinned or bolted with connector 72 through lug holes 1D. With lever 71A rotated back toward the trailing side, tube 8 is slid into sleeve 1A of clamp body 1. Lever 71B is then rotated forward to the leading side as shown in FIG. 6b so that one side of the cam engages a corresponding indent 8D of main tube 8.

Telescoping Coupling Assembly

FIGS. 7a through 7h show a preferred exemplary embodiment of telescoping coupling assembly 103B which, in addition to tube 8, includes four telescoping tubular segments, tube 20, tube 25, tube 29, and tube 34, each of decreasing diameter from the first to the second end of linking bar 103, so as to allow each tube to fit inside the other and which, when extended, comprises a rigid segment of set length and, as detailed below, a segment that allows a fixed amount of free travel along the longitudinal axis.

Figure 7A:
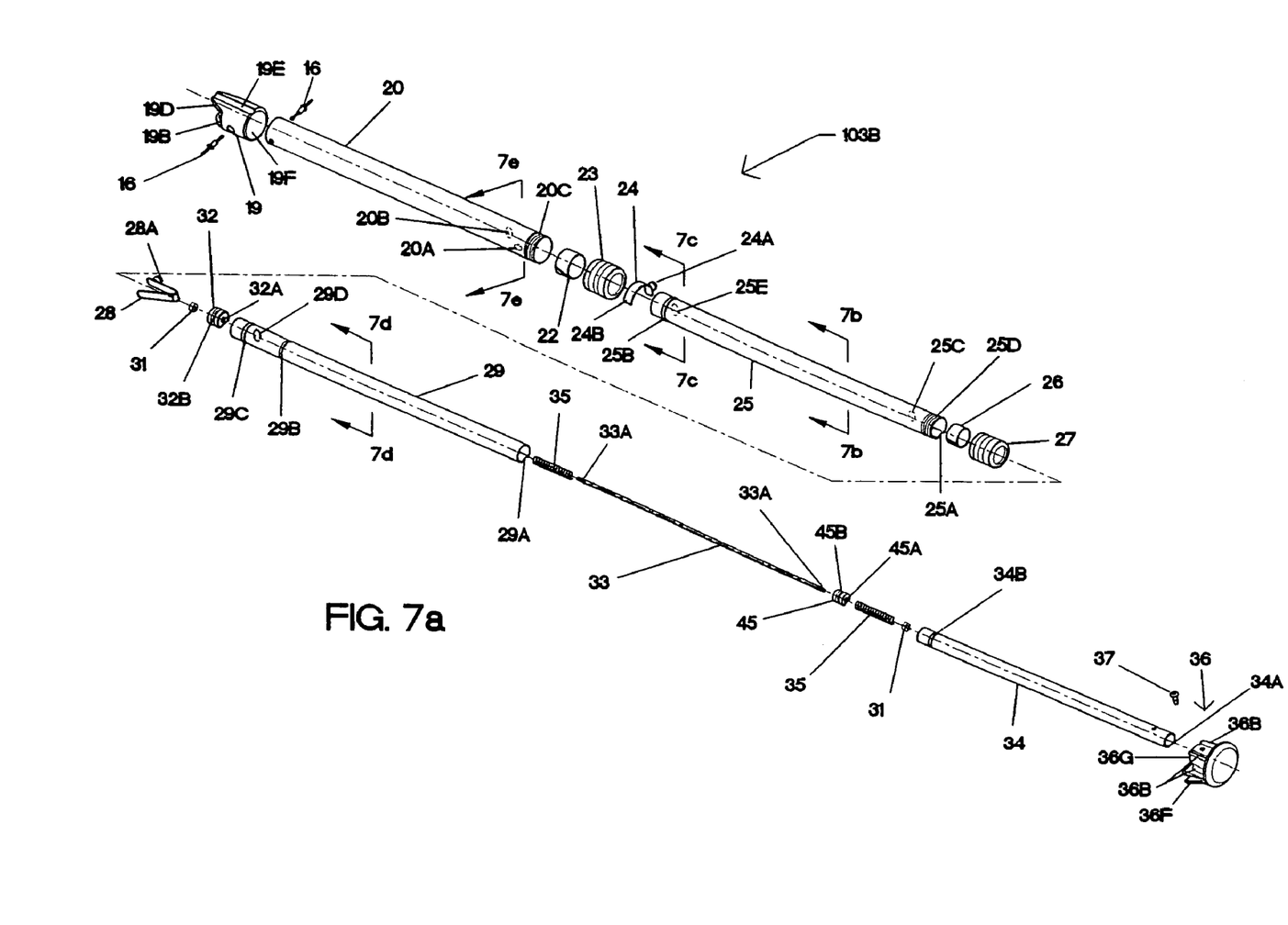
FIG. 7a is a perspective assembly view of an exemplary linking bar assembly of the invention.
Figure 7B:
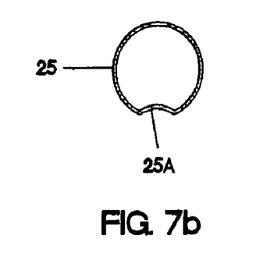
FIG. 7b is a cross-sectional view of tube 25.

Attached to the leading end of telescoping coupling assembly 103B is tab connector 19 which has a tubular sleeve 19F for accepting the leading end of tube 20 and to which it is secured by rivets 16. Tab connector 19 has a longitudinal slot 19E running along its top. Slot 19E is sized to accept inwardly projecting slot 8A of cargo rack and stowage assembly 103A when telescoping coupling assembly 103B is stowed inside cargo rack and stowage assembly 103A. Attached to the trailing end of telescoping coupling assembly 103B is end cap 36 which has a tubular sleeve 36G with an internal profile similar to and designed to accept the trailing end of tube 34. End cap 36 is secured to tube 34 by self-tapping screw 37.

Figure 14:
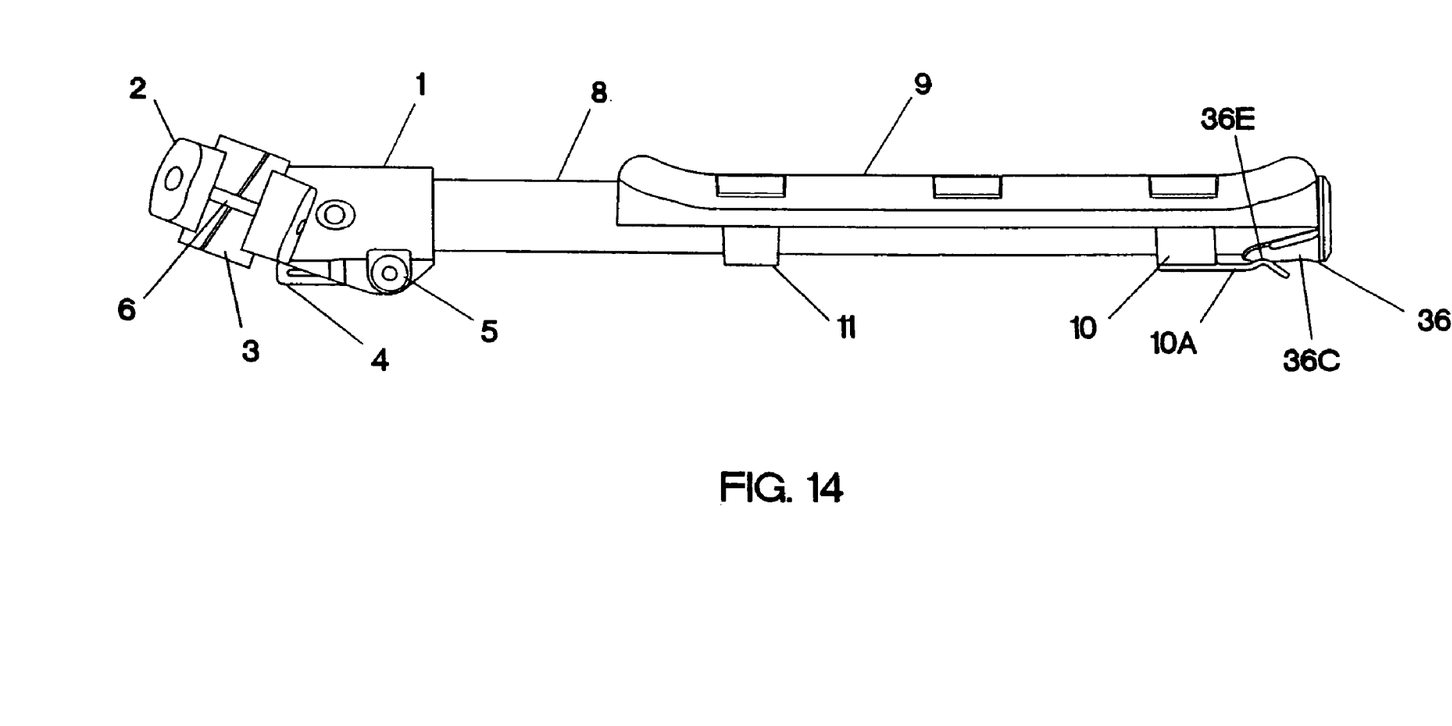
FIG. 14 is an elevational view of the first connector, cargo rack and stowage assembly, and linking bar assembly in a retracted and stowed condition.

Tubes 25, 29 and 34 are respectively provided with indented grooves 25A, 29A and 34A running the length of the tubes and that prevent one tube from rotating axially relative to its adjacent tube; such grooves may be in the virtually any shape that restricts axial rotation, including arcuate, oval, square, and octagonal. Tube 20 has a circular indentation 20A shown in FIGS. 7e and 7h which prevents tube 25 from rotating when extended inside tube 20. The length of the telescoping sections of the tubes is preferably such that, when fully retracted, all sections nest within tube 8, as shown in FIG. 14.

In use, tube 29 is secured to tube 25 by a V-shaped snap button connector 28 inside tube 29 with the button head 28A projecting out of capture hole 29D of tube 29 and which also projects out of a corresponding aligned capture hole 25C of tube 25 when tube 29 is fully extended from tube 25. A threaded clutch nut 27 is screwed onto corresponding threads 25D on the trailing end of tube 25, which secures a split bushing 26 to connect tube 29 and tube 25. When tube 29 is fully extended and snap button head 28A projects through the aligned hole 25C, clutch nut 27 is tightened, forcing split bushing 26 further into the gap between tube 29 and tube 25. This has the effect of stiffening the extended rod and reducing the amount of lateral movement between the tubes.

A similar arrangement secures tube 25 to tube 20. Tube 25 is fixed to tube 20 by an arcuate snap button 24 inside tube 25 with button head 24A projecting out of capture hole 25E and which also projects out of the corresponding aligned capture hole 20B when tube 25 is fully extended from tube 20. Another threaded clutch nut 23 is screwed onto corresponding threads 20C, which secures another split bushing 22 to connect tube 25 and tube 20. When tube 25 is fully extended and snap button 24 projects through the aligned hole of tube 20, clutch nut 23 is tightened, forcing split bushing 22 further into the gap between tube 25 and tube 20. This has the same effect noted above of stiffening the extended rod and reducing the amount of lateral movement between the tubes.

Figure 7C:
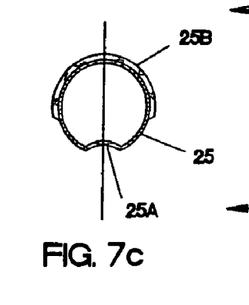
FIG. 7c is a cross-sectional view of tube 25 at the location of out-dent 25B.
Figure 7D:
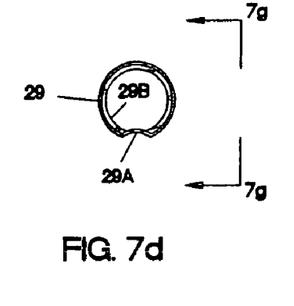
FIG. 7d is a cross-sectional view of tube 29 at the location of indent 29B.
Figure 7E:
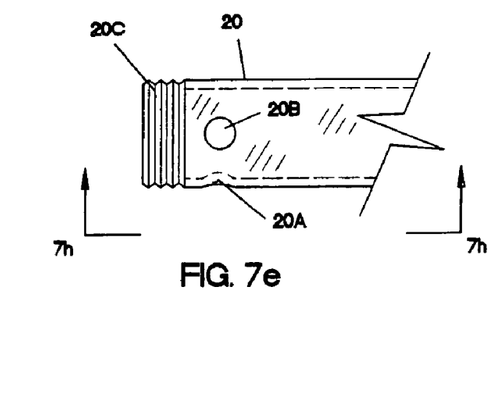
FIG. 7e is a side elevational view of the threaded end of tube 20.
Figure 7F:
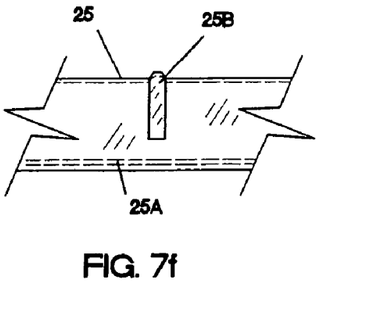
FIG. 7f is a side elevational view of tube 25 at the location of out-dent 25B.
Figure 7G:
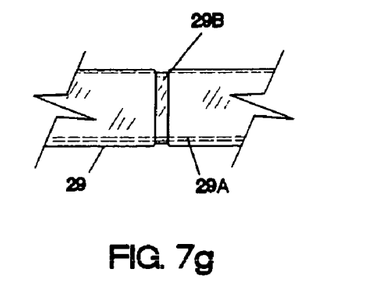
FIG. 7g is a side elevational view of tube 29 at the location of indent 29B.
Figure 7H:
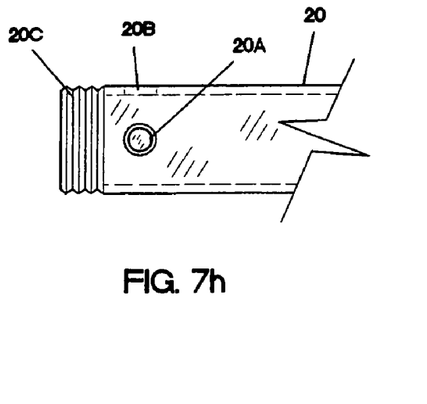
FIG. 7h is a bottom plan view of the threaded end of tube 20.

Retraction of the telescoping tubes is accomplished by loosening the clutch nuts, pushing in the snap buttons, and sliding the smaller tube into the larger tube. Tubes 25 and 29 have respective out-dents 25B and 29C around the tubes to prevent them from being pulled completely out of the adjacent larger tubes when extended. Out-dent 25B is illustrated in FIGS. 7c and 7f. Tubes 29 and 34 have respective indents 29B and 34B to secure respective bushings 32 and 45. Indent 29B is shown in FIGS. 7d and 7g. Other arrangements may also be used to secure tube 29 to tube 25 and tube 25 to tube 20, including pin connections or twist-and-lock type connections known in the art.

Free Travel Component of Linking Bar

Figures 8A, 8B:
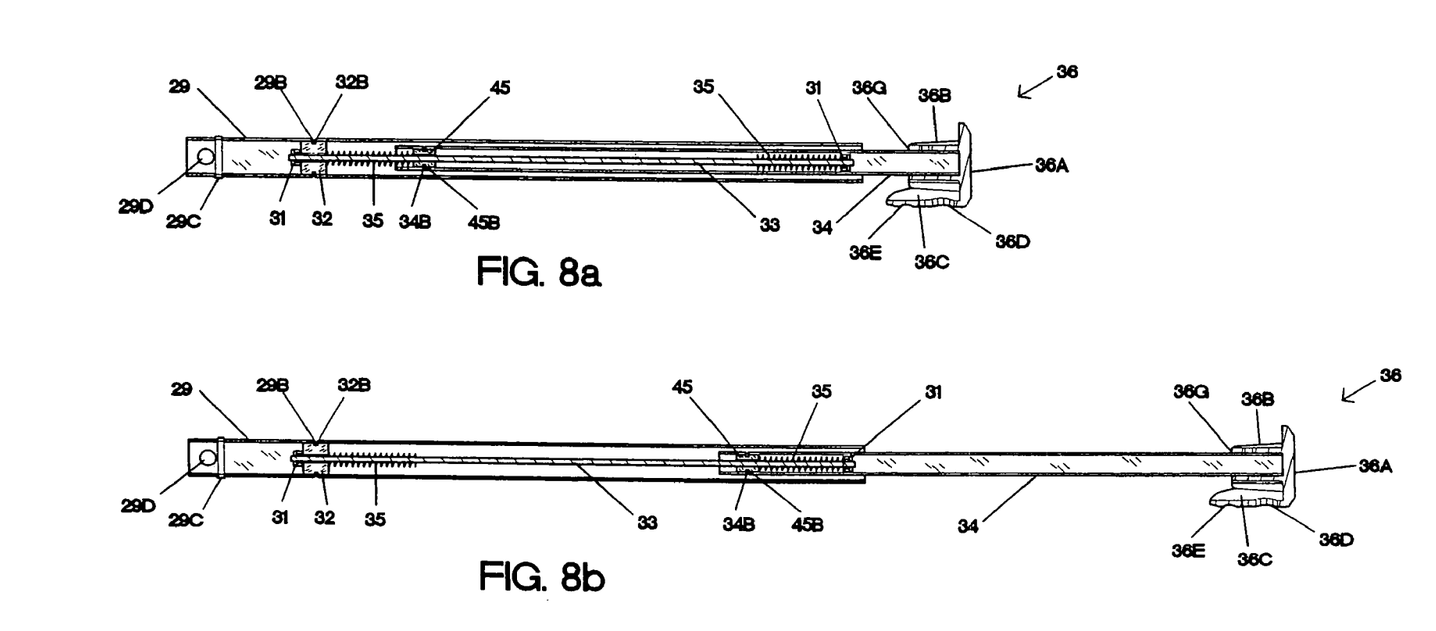
FIG. 8a is a cross-sectional view of a free travel segment of the linking bar assembly in a compressed configuration.
FIG. 8b is a cross-sectional view of the free travel segment of FIG. 8a in an extended configuration.

While tubes 20, 25, and 29 lock into place when extended, one tube (for example, tube 34) is free to travel axially a fixed distance inside an adjacent tube (for example, tube 29) before reaching its travel limit in either direction. In a preferred embodiment, tube 29 may travel approximately six inches with no resistance, although other free travel distances could easily be incorporated by increasing or decreasing the various tube lengths. As shown in FIGS. 7a, 8a and 8b, this free travel is accomplished by incorporating a grooved bushing 45 with groove 45B and hole 45A into the lead end of tube 34 and securing with corresponding indentation groove 34B in tube 34. A corresponding indentation groove is made in tube 34 to hold grooved bushing 45 in place when under load. A similar but larger grooved bushing 32 with groove 32B and hole 32A is incorporated into tube 29 and held in place with corresponding groove 29B. Rod 33 with threaded ends 33A, springs 35 and nuts 31 is then assembled as shown in FIGS. 8a and 8b with a nut 31 screwed onto each end of rod 33. The finished assembly, shown in FIGS. 8a and 8b, illustrates the assembly in the compressed and extended arrangements.

This arrangement allows tube 34 to travel approximately six inches inside tube 29 without resistance but to encounter a spring-dampened positive stop under load at the end of the travel distance in either direction. In a preferred embodiment, the tubes are made from aluminum but could be made from other lightweight high strength materials including, but not limited to, polymer, thin gauge steel, or fiberglass.

In use, such an assembly dissipates the majority of de-stabilizing forces arising between the two bicycles as might be encountered on a typical ride wherein each bicycle continually moves a small distance axially back and forth relative to the other bicycle due to road surface changes and differences in pull and push forces. Without this free longitudinal travel, any axial movement of one bicycle such as that caused by a rough road or riding over an object, would be directly transmitted to the other connected bicycle, thereby causing an uncomfortable and potentially de-stabilizing event. The springs act as shock absorbers to dampen the impact should the positions of the bikes cause tube 34 to reach the limit of its travel in either direction, as can happen when one bike accelerates or brakes sharply and the other bicycle doesn't.

Connection of Linking Bar to Second Connector

Referring to FIGS. 9, 10a, 10b, and 10c, end cap 36 has axial guide wings 36B along the outside of the end cap sleeve, which act as guides to aid in keeping end cap 36 centered with respect to tube 8 during stowage. End cap 36 has pull tabs 36F that extend downward from the bottom of end cap 36 for pulling end cap 36 out of tube 8 in preparation for linking the bikes together. End cap 36 has a projection 36C on its underside that has an indent 36E, shown in FIG. 9, which engages with spring clip 10A of end cap securing bracket 10 (see FIG. 5) of cargo rack and stowage assembly 103A to retain the telescoping coupling assembly 103B within tube 8 during stowage. FIG. 14 shows spring clip 10A engaging the indent of end cap 36 in the retracted and stowed configuration.

Figure 9:
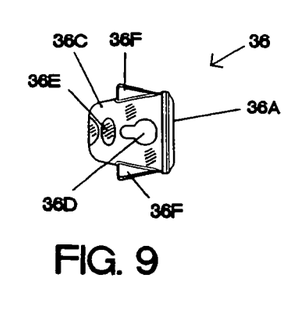
FIG. 9 is a bottom plan view of the underside of the end cap of the linking bar assembly.

End cap 36 preferably is provided with a keyhole-shaped hole 36D on its underside as shown in FIG. 9, to accept ball stud 21 of second connector 102 in a snap-on friction fit type of ball joint connection.

Figure 10A:
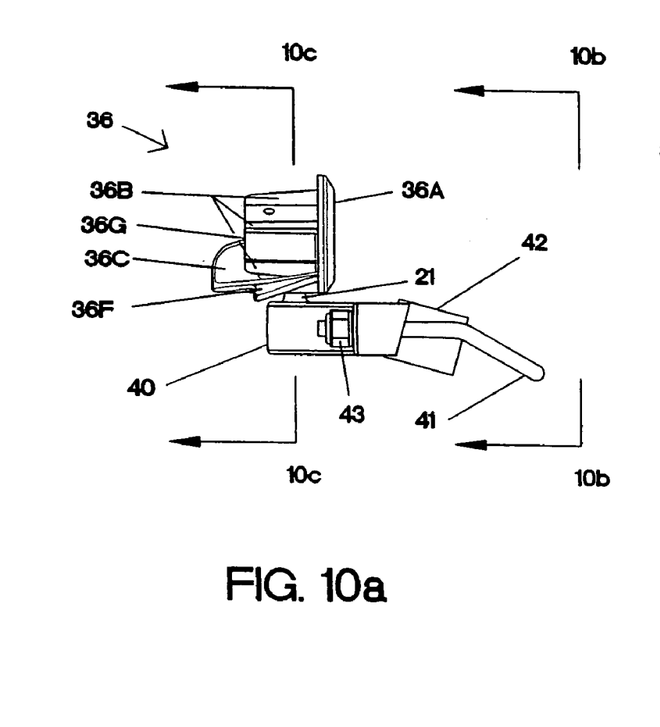
FIG. 10a is a side elevational view demonstrating lateral range of motion for the end cap of the linking bar assembly when connected to a ball stud of the second connector.
Figure 10B:
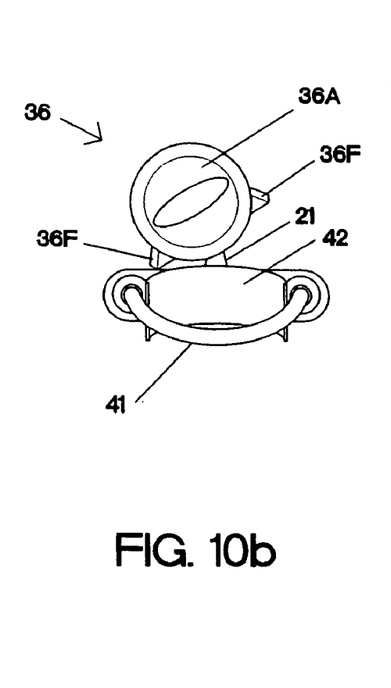
Figure 10C:
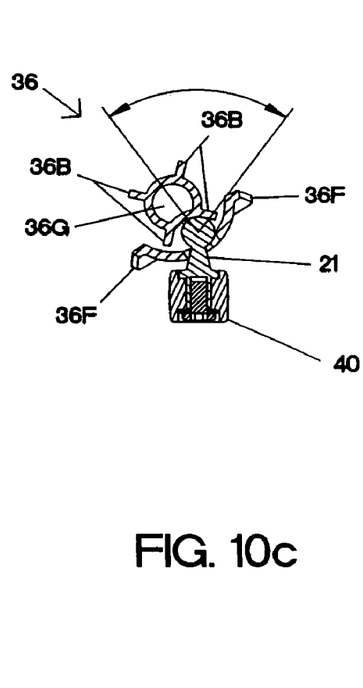
FIG. 10c is an end cross-sectional view of the connection arrangement shown in FIGS. 10a and 10b.

FIG. 10c illustrates about 75° of lateral rotation that the arrangement allows between end cap 36 and ball stud 21; when the limit is reached in either direction, end cap 36 and ball stud 21 separate. This limited lateral rotation of the ball joint connection allows the bicycles to remain connected during riding because the relative lateral movements of the bicycles typically do not exceed such a degree of rotation. However, should the trailing bicycle fall, the lateral rotation of the bicycles relative to each other would exceed the permitted amount of rotation and the connection will separate, thereby preventing the lead bicycle from dragging the trailing bicycle. It should also be noted that the non-rotational property of the linking bar assembly 103 facilitates this feature since otherwise, rotational forces would be transmitted to end cap 36, causing it to separate from ball stud 21 even though the degree of lateral movement between end cap 36 and ball stud 21 has not been exceeded.

In a situation where the lead bicycle falls, it is desirable that linking bar assembly 103 stay connected to prevent the trailing rider from potentially running into the lead rider. The keyhole-shaped hole 36D provides this capability. Should lead bicycle 50 fall and trailing bicycle 60 continue forward, linking bar assembly 103 would be in a state of compression and the neck of ball stud 40 will slide into the narrow slot of the keyhole 36D of end cap 36, capturing the ball head of ball stud 21 and preventing it from releasing from end cap 36. The continued engagement of bicycle connecting device 100 will cause separation of the two bicycles rather than a collision, since the trailing bicycle will either be kept at a distance from the lead bicycle or the trailing bicycle will pass the lead bicycle on either side and linking bar assembly 103 will then safely release due to the design features of ridge connector 18 and tab connector 19 previously described.

Figure 11A:
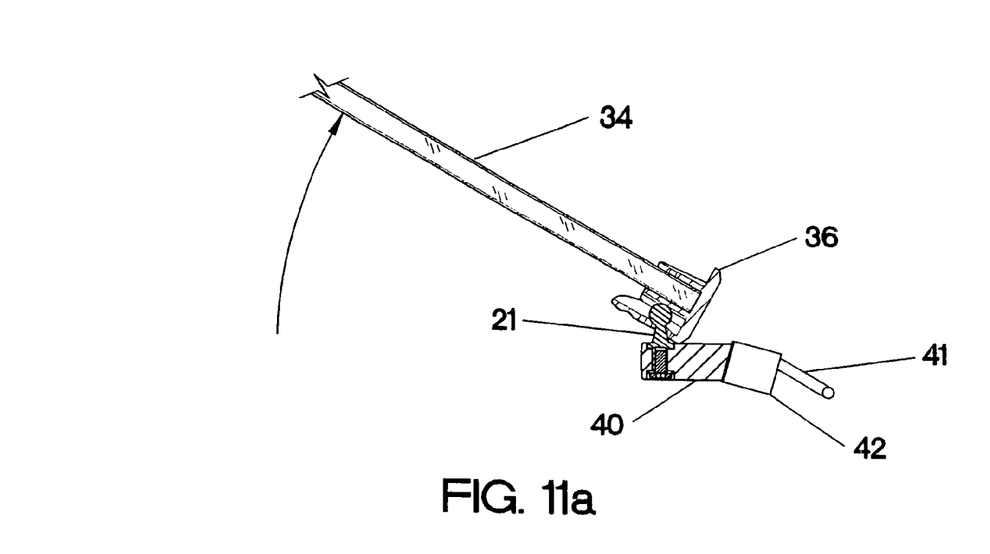
FIG. 11a is a cross-sectional view demonstrating vertical plane upward range of motion for the connection arrangement shown in FIGS. 10a, 10b and 10c.
Figure 11B:
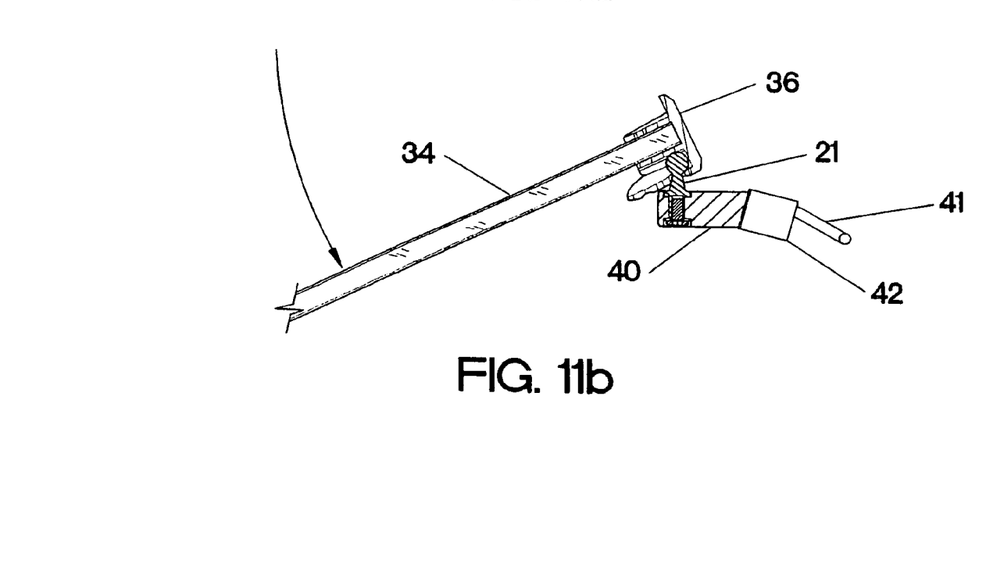
FIG. 11b is a cross-sectional view demonstrating vertical plane downward range of motion for the connection arrangement shown in FIGS. 10a, 10b and 10c.

FIGS. 11a and 11b show that about 60° of vertical rotation are allowed between end cap 36, ball stud 21, and ball mount 40. This rotation capability coupled with the above-noted rotation capability of ridge connector 18 when in operational position inside tube 8 allows ample latitude for connecting bicycles of differing sizes in either the lead bicycle or trailing bicycle position.

Connection of Linking Bar & Cargo Rack & Stowage Assembly

Figure 12A:
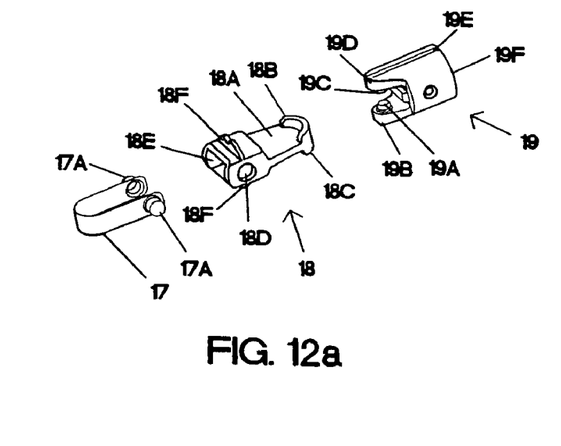
FIG. 12a is a perspective assembly view of various components of the cargo rack and stowage and linking bar assemblies.
Figure 12B:
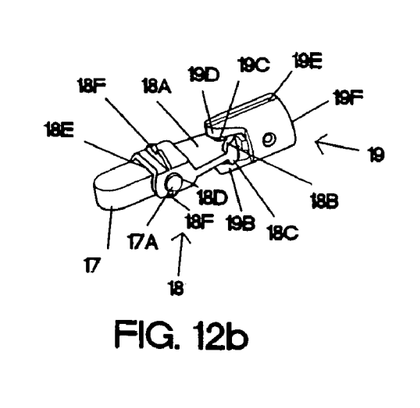
FIG. 12b is a perspective view of the components shown in FIG. 12a after assembly.
Figure 12C:
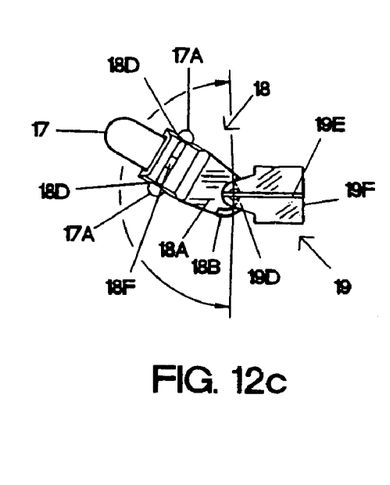
FIG. 12c is a plan view of the components shown in FIG. 12b and illustrating the range of motion in the horizontal plane for this connection.

Referring to FIGS. 12a, 12b, and 12c, tab connector 19 has lower and upper projections 19B and 19D, these projections having respective cylindrical tabs 19A and 19C. Tabs 19A and 19C encircle and capture the semi-circular shaped rims 18B and 18C of ridge connector 18 of cargo rack and stowage assembly 103A. The geometry of ridge connector 18 and tab connector 19 when engaged allow approximately 180° of lateral rotation (90° on either side of the axial centerline of the parts) yet remain connected. When the 90° limit is exceeded on either side, tab connector 19 and the attached tubing assembly will disconnect from ridge connector 18.

In use, this has the effect of decoupling the bicycles and preventing an unsafe situation when the trailing bicycle begins to pass the lead bicycle or the direction of travel of the two bicycles becomes sufficiently divergent, as can occur during tight turns or when the trailing rider fails to otherwise follow the lead rider. The geometry and size of the semi-circular rim on ridge connector 18 may easily be changed to increase or decrease the limit of rotation at which separation takes place. In a preferred embodiment, tab connector 19 is typically made of reinforced polymer, but may also be made from other lightweight durable materials such as aluminum or fiberglass. Other connection configurations may also be used to produce similar levels of horizontal rotation and release and still remain within the scope of the invention.

Stowage of Linking Bar

FIG. 14 shows bicycle connecting assembly 100 in a retracted and stowed arrangement. This is desirable when two riders wish to ride independently and is accomplished with no tools and typically in less than a minute. To convert from a bicycle-linking arrangement to a stowed arrangement, clutch nuts 23 and 27 are loosened approximately one half turn. End cap 36 is then lifted off of ball joint 21. Then snap button head 24A is depressed and tube 25 is slid into tube 20. Next, snap button head 28A is depressed and tube 29 is slid into tube 25. The snap button heads 17A are then depressed and tube 20 is slid into tube 8. Finally, end cap 36 is pushed in until spring latch 10A of end cap securing bracket 10 engages indent 36E on the underside projection 36C of end cap 36, thereby securing the entire telescoping coupling assembly 103B within cargo rack and stowage assembly 103A.

Figures 15A, 15B:
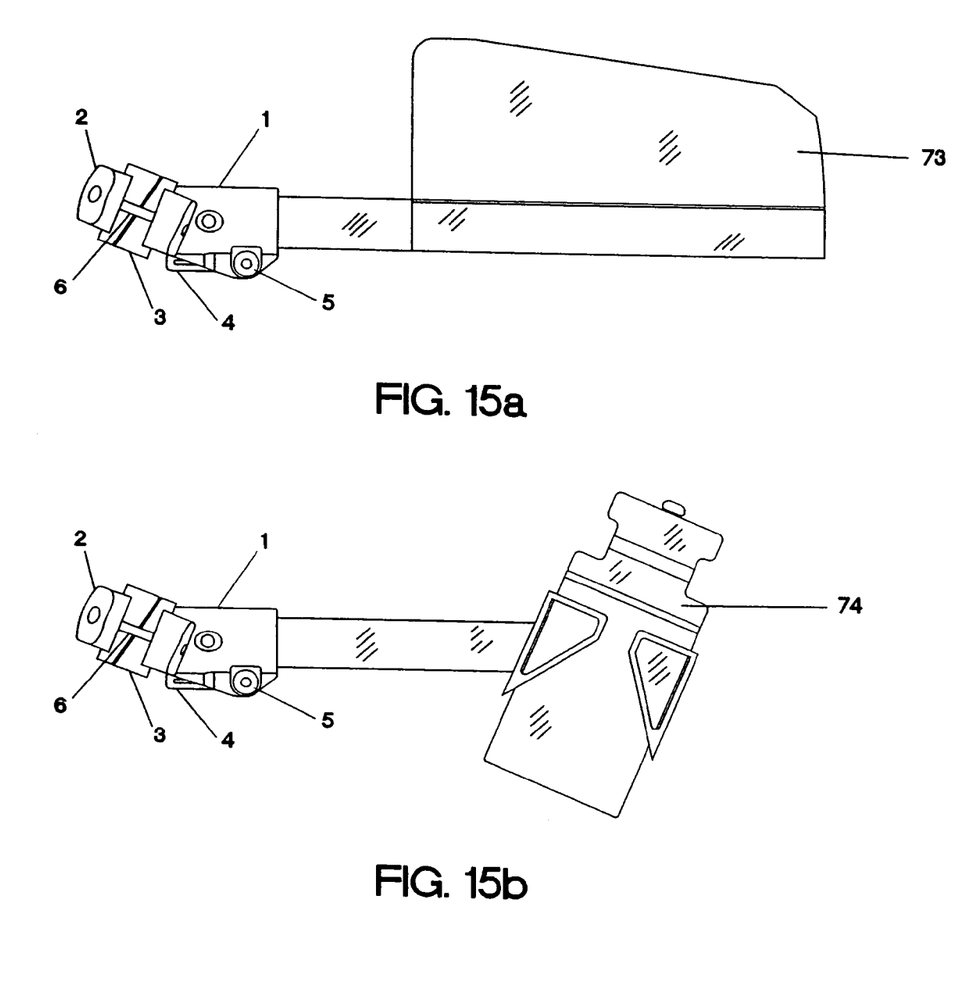
FIG. 15a is an elevational view of an exemplary tool kit accessory that can be connected to the first connector.
FIG. 15b is an elevational view of an exemplary bottle carrier accessory that can be connected to the first connector.

FIGS. 15a and 15b respectively illustrate a tool kit accessory 73 and a bottle carrier 74 accessory that could replace cargo rack and stowage assembly 103A and be connected to first connector 101 during a given ride should an individual rider desire to take along such accessories instead of the linking bar assembly.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

The invention claimed is:

1. A coupling device for connecting a lead bicycle and a trailing bicycle in tandem comprising:
    a first connector attachable to said lead bicycle;
    a second connector attachable to said trailing bicycle; and
    a telescoping linking bar having a first end and a second end and being releasably attachable to said first and second connectors, wherein a portion of said linking bar allows limited longitudinal travel and wherein said linking bar is provided with an articulated joint that permits limited horizontal, vertical and torsional rotation of said linking bar about its longitudinal axis;
wherein said first end is connected to said first connector and said second end is connected to said second connector and said linking bar comprises multiple tubes of decreasing diameter from said first end to said second end;
wherein said limited longitudinal travel takes place within one of said multiple tubes and said travel is governed by a rod of predetermined length within said one tube said rod being provided with keepers on each end and being slidable through a pair of bushings.

2. The device of claim 1 wherein said limited longitudinal travel is cushioned by springs situated at the ends of said rod.

3. The device of claim 2 wherein said longitudinal travel takes place within the penultimate of said multiple tubes.

4. The device of claim 1 wherein said articulated joint is situated between the first and the second of said multiple tubes.

5. The device of claim 4 wherein said articulated joint separates when the limits of said horizontal rotation are exceeded.

6. The device of claim 1 wherein said second end is provided with a coupler adapted to receive a ball stud connected to said second connector.

7. The device of claim 6 wherein said coupler receives said ball stud via a keyhole-shaped female portion and the connection of said coupler to said ball stud permits limited horizontal, vertical, and torsional relative rotation between said coupler and said ball stud.

8. The device of claim 7 wherein said coupler and said ball stud disconnect when said torsional or vertical relative rotation exceeds about 35°.

9. The device of claim 1 wherein said first connector is provided with an accessory; wherein said accessory is a cargo platform attached to the largest diameter tube of said multiple tubes and the remainder of said multiple tubes telescope into said largest diameter tube.

10. The device of claim 1 wherein said first connector is provided with a clarnpable female portion adapted to matingly receive said first end of said linking bar and wherein said clampable female portion is provided with a longitudinal ridge on its inner side and said first end of said linking bar is provided with a corresponding longitudinal slot adapted to matingly engage with said longitudinal ridge.

11. The device of claim 10 wherein said first end of said linking bar is provided with a least one spring-loaded snap button and said clampable female portion is provided with at least one hole adapted to matingly receive said at least one snap button.

12. The device of claim 11 wherein said clampable female portion is clampable about said first end of said linking bar by a cam and bolt assembly.

* * * * *